(12) United States Patent
Moritani et al.

(10) Patent No.: US 11,088,589 B2
(45) Date of Patent: Aug. 10, 2021

(54) POWER TRANSMISSION DEVICE

(71) Applicant: SUMITOMO HEAVY INDUSTRIES, LTD., Tokyo (JP)

(72) Inventors: Koji Moritani, Kanagawa (JP); Mitsuhiro Tamura, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 16/165,792

(22) Filed: Oct. 19, 2018

(65) Prior Publication Data
US 2019/0131846 A1 May 2, 2019

(30) Foreign Application Priority Data

Nov. 2, 2017 (JP) .............................. JP2017-212330

(51) Int. Cl.
| | |
|---|---|
| *H02K 5/22* | (2006.01) |
| *H02K 7/116* | (2006.01) |
| *H02K 11/215* | (2016.01) |
| *H02K 5/08* | (2006.01) |
| *H02K 15/14* | (2006.01) |

(52) U.S. Cl.
CPC ............... *H02K 5/22* (2013.01); *H02K 5/08* (2013.01); *H02K 7/116* (2013.01); *H02K 11/215* (2016.01); *H02K 15/14* (2013.01)

(58) Field of Classification Search
CPC .... F16H 3/72; F16H 3/44; H02K 5/22; H02K 5/08; H02K 11/215; H02K 7/116; H02K 15/14
See application file for complete search history.

(56) References Cited

U.S. PATENT DOCUMENTS

| | | | | |
|---|---|---|---|---|
| 3,239,699 A | * | 3/1966 | Ferrary ................. | H02K 7/116 310/83 |
| 3,748,510 A | * | 7/1973 | McNeal ................. | H02K 3/50 310/71 |
| 5,497,041 A | * | 3/1996 | Kondoh ................. | H02K 3/26 310/82 |
| 6,316,859 B1 | * | 11/2001 | Aoyama ................. | H02K 3/24 310/214 |

(Continued)

FOREIGN PATENT DOCUMENTS

| | | |
|---|---|---|
| CN | 1141528 A | 1/1997 |
| CN | 102684362 A | 9/2012 |

(Continued)

OTHER PUBLICATIONS

Office Action issued in Chinese Application No. 201811195687.3, dated May 6, 2020.

(Continued)

*Primary Examiner* — Forrest M Phillips
(74) *Attorney, Agent, or Firm* — Michael Best & Friedrich LLP

(57) ABSTRACT

A power transmission device having a motor which includes a stator around which a coil is wound, a motor frame which covers the stator, and a cover which covers an axial end portion of the motor frame. In addition, the cover is formed of a non-conductive material, and a shortest creeping distance between a coil end of the coil and the cover is shorter than 6.3 mm.

16 Claims, 2 Drawing Sheets

(56) References Cited

U.S. PATENT DOCUMENTS

| | | | | |
|---|---|---|---|---|
| 8,138,643 | B2* | 3/2012 | Fukasaku | H02K 3/50 |
| | | | | 310/71 |
| 9,461,523 | B2* | 10/2016 | Shoykhet | H02K 9/00 |
| 10,468,933 | B2* | 11/2019 | Tang | H02K 5/225 |
| 2009/0230824 | A1* | 9/2009 | Hornberger | G01D 5/145 |
| | | | | 310/68 B |
| 2013/0221781 | A1* | 8/2013 | Nakayama | H02K 5/04 |
| | | | | 310/89 |
| 2019/0072044 | A1 | 3/2019 | Nagai et al. | |

FOREIGN PATENT DOCUMENTS

| | | |
|---|---|---|
| CN | 202602439 U | 12/2012 |
| CN | 205544728 U | 8/2016 |
| JP | H07-248046 A | 9/1995 |
| JP | 2000-228843 A | 8/2000 |
| JP | 2017-150369 A | 8/2017 |

OTHER PUBLICATIONS

Office Action issued in Japanese Application No. 2017-212330, dated Apr. 6, 2021.

* cited by examiner

POWER TRANSMISSION DEVICE

RELATED APPLICATIONS

Priority is claimed to Japanese Patent Application No. 2017-212330, filed Nov. 2, 2017, the entire content of which is incorporated herein by reference.

BACKGROUND

Technical Field

A certain embodiment of the present invention relates to a power transmission device.

Description of Related Art

The related art discloses a power transmission device having a motor which includes a stator around which a coil is wound, a motor frame which covers an outer peripheral side of the stator, and a cover which covers an axial end portion of the stator.

SUMMARY

According to an embodiment of the present invention, there is provided a power transmission device including: a motor having a stator around which a coil is wound, a motor frame which covers the stator, and a cover which covers an axial end portion of the motor frame, in which the cover is formed of a non-conductive material, and a shortest creeping distance between a coil end of the coil and the cover is shorter than 6.3 mm.

DETAILED DESCRIPTION

In a motor of a power transmission device of the related art, it is necessary to provide a relatively long creeping distance between a coil and a cover so as to secure sufficient insulation of the coil. Accordingly, there are problems that weight of the power transmission device increases due to an increase in a volume of the power transmission device, particularly an increase in an axial length.

It is desirable to provide a power transmission device capable of achieving weight saving and reduction in an axial dimension.

According to the power transmission device of the present invention, it is possible to achieve weight saving and reduction in an axial dimension.

Hereinafter, an embodiment of the present invention will be described in detail with reference to the drawings.

Figure 1:
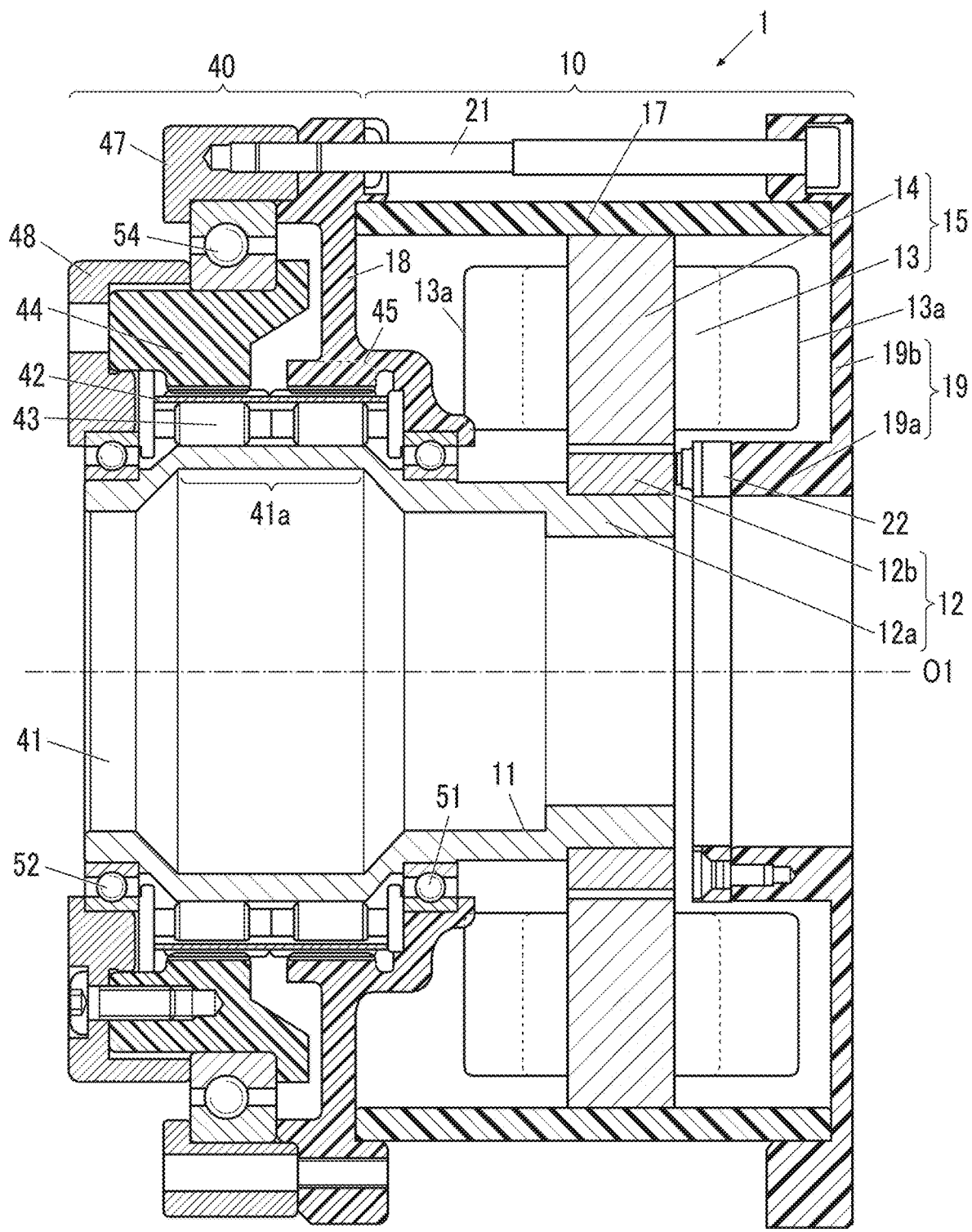
FIG. 1 is a sectional view showing a power transmission device of an embodiment of the present invention.
Figure 2:
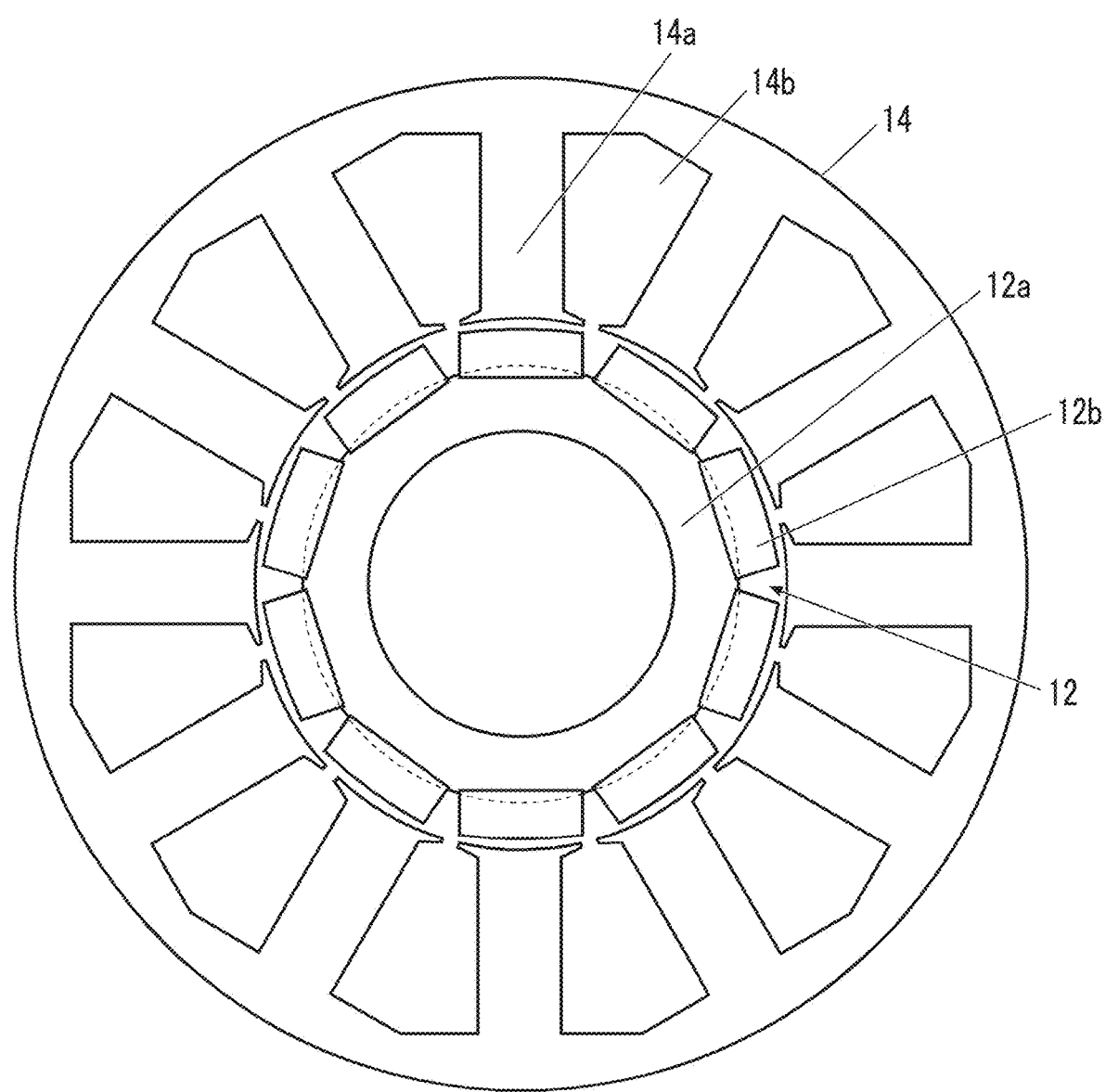
FIG. 2 is a front view showing a stator core and a rotor in FIG. 1.

FIG. 1 is a sectional view showing a power transmission device of the embodiment of the present invention. FIG. 2 is a front view showing a stator core and a rotor in FIG. 1. In the present specification, a direction along a center axis O1 of each of a rotor shaft 11 and an input shaft 41 is defined as an axial direction, a direction orthogonal to the center axis O1 is defined as a radial direction, and a direction rotating about the center axis O1 is defined as a circumferential direction.

A power transmission device 1 of the present embodiment is a geared motor in which a motor 10 and a speed reducer 40 are connected to each other to be unitized.

The motor 10 includes a rotor 12 which is rotationally driven, a rotor shaft 11 which is integrated with the rotor 12, and a stator 15 which includes a coil 13 and a stator core 14. In addition, the motor 10 includes a motor frame 17 which covers an outer peripheral side of the stator 15, and a first cover 18 and a second cover 19 which cover axial end portions of the stator 15 and the motor frame 17.

The stator core 14 is formed of a magnetic material, and as shown in FIG. 2, includes a plurality of core segments 14a and a plurality of slots 14b. The plurality of core segments 14a are disposed to be arranged in the circumferential direction such that inner peripheral surfaces of the core segments 14a face the rotor 12. The plurality of slots 14b are provided between the plurality of core segments 14a.

The coil 13 passes through the plurality of slots 14b and is wound around the core segments 14a. A portion of the coil 13 protrudes outward from an axial end of the stator core 14. A portion protruding in the axial direction from the slots 14b is a coil end 13a.

For example, the rotor 12 includes a shaft portion 12a which is rotatably supported and a plurality of permanent magnet 12b which are fixed to an outer peripheral surface of the shaft portion 12a. The shaft portion 12a of the rotor 12 and the rotor shaft 11 are formed of metal, have a hollow structure, and are formed to be integrated with each other.

The motor frame 17 is formed of a resin and is in contact with an outer peripheral portion of the stator core 14 so as to fix the stator core 14.

The first cover 18 is formed of a resin, and covers mainly the other end (speed reducer 40 side, a load side) in the axial direction of the stator core 14. In addition, the material of the first cover 18 is not limited to the resin and may be a non-conductive material. For example, the material of the first cover 18 may be a composite material of materials different from the resin or a bake material (paper bake material or cloth bake material). The first cover 18 is formed in an annular shape, and includes a through-hole, through which the rotor shaft 11, at a center of the first cover 18. A bearing 51 is fitted into an inner peripheral portion of the first cover 18 and the rotor shaft 11 and the input shaft 41 are rotatably supported by the bearing 51. The first cover 18 is not particularly limited. However, for example, the first cover 18 is connected to the second cover 19 via a bolt 21, and thus, the motor frame 17 is interposed between the first cover 18 and the second cover 19 so as to be fixed.

A shortest creeping distance from the coil end 13a to the first cover 18 is shorter than 6.3 mm. In the motor of the related art, the first cover is configured of a conductive material, and the creeping distance is 6.3 mm or more to secure insulation properties. Accordingly, there are problems weight of the entire device increases due to an increase in a volume of a power transmission device, an increase in an axial length, and an increase in lengths of a rotor shaft and an input shaft. However, in the present embodiment, the first cover 18 has the insulation properties (is formed of a non-conductive material), the creeping distance is shorter than 6.3 mm, and thus, the above-described problems are alleviated. In addition, the creeping distance between the first cover 18 and the coil end 13a is more preferably 3 mm or less, and most preferably 1 mm or less.

More specifically, the first cover 18 of the present embodiment is disposed to be in contact with a portion of the coil end 13a of the stator 15. The first cover 18 has the insulation properties, and thus, even when the first cover 18 is in contact with a portion of the coil 13, sufficient insulation properties between the coil 13 and the first cover 18 and sufficient insulation properties between the motor 10 and the speed reducer 40 can be secured. A contact area between the first cover 18 and the coil end 13a is preferably 50% or less of a surface area of the coil end 13a on the speed reducer 40 side, and more preferably 10% or less of the surface area. In a case where the first cover 18 is in contact with the entirety of the coil end 13a, a coefficient of thermal expansion of the coil end 13a is different from a coefficient of thermal expansion of the first cover 18, and thus, there is problem in durability of the first cover 18 and the coil end 13a. However, the contact area is set as described above, and thus, it is possible to suppress a decrease in the durability even when the coefficients of thermal expansion are different from each other.

The second cover 19 is formed of a resin and covers mainly one end (a side opposite to the speed reducer 40, a counter load side) in the axial direction of the stator 15. In addition, the material of the second cover 19 is not limited to the resin and may be a non-conductive material. For example, the material of the first cover 18 may be a composite material of materials different from the resin or a bake material (paper bake material or cloth bake material). The second cover 19 is formed in an annular shape and includes an inner peripheral wall portion 19a which covers an inner peripheral side of the coil end 13a positioned on the side opposite to the speed reducer 40 and a rear wall portion 19b which covers one end side of the side opposite to the speed reducer 40 of the stator 15. One end surface of the inner peripheral wall portion 19a faces the permanent magnet 12b of the rotor 12 and a magnetic sensor 22 for detecting rotation is provided in a portion of the end surface in the circumferential direction.

The second cover 19 may be disposed close to the coil end 13a such that a shortest creeping distance from the coil end 13a is shorter than 6.3 mm. The second cover 19 may be disposed such that a portion thereof is in contact with the coil end 13a.

For example, the speed reducer 40 is a bending meshing type gear device, and includes an input shaft 41 having a wave generator 41a, an external gear 42 which is bent and deformed by the wave generator 41a, and two internal gear 44 and 45 which mesh with the external gear 42. In addition, the speed reducer 40 includes casings 47 and 48 which cover an outer peripheral portion of the speed reducer 40, bearings 51 and 52 which rotatably support the input shaft 41, and a main bearing 54 which rotatably supports one internal gear 44 with respect to the casing 47.

The input shaft 41 is a metal shaft having a hollow structure, is coaxially with the rotor shaft 11, and is formed of a single member which is integrated with the rotor shaft 11. In addition, the input shaft 41 and the rotor shaft 11 may be separately formed from each other, and may be configured to be connected to each other. The wave generator 41a whose outline of the cross section orthogonal to the center axis O1 is noncircular (for example, elliptical) is provided in a portion of the input shaft 41. In a portion except for the wave generator 41a of the input shaft 41, a cross section orthogonal to the center axis O1 is circular.

The external gear 42 is rotatably supported relative to the wave generator 41a via the roller bearing 43. The external gear 42 is fitted to the wave generator 41a in a state where the roller bearing 43 is interposed therebetween along an outer peripheral surface of the wave generator 41a.

Each of the two internal gears 44 and 45 has stiffness and both the two internal gears 44 and 45 are formed of a resin. The number of teeth of the internal gear 44 and the number of teeth of the internal gear 45 are different from each other (for example, the number of teeth of the internal gear 44 has the same as that of the external gear 42 and the internal gear 45 has two more teeth than the internal gear 44). One internal gear 44 is connected to the casing 48 which covers the axial end side of the speed reducer 40, and the other internal gear 45 is connected to the casing 47 which covers the outer peripheral portion of the speed reducer 40. The other internal gear 45 has a tubular structure and is integrally formed with the first cover 18 of the motor 10 using the same material as a single member. The first cover 18 also serves as an input-side cover of the speed reducer 40. That is, the first cover 18 covers the external gear 42 and the roller bearing 43 on the motor 10 side in the axial direction, and for example, prevents leakage of a lubricant from the speed reducer 40.

The bearings 51 and 52 support the input shaft 41 on both sides of the wave generator 41a in the axial direction. One bearing 51 is fitted into an inner periphery of the first cover 18 and rotatably supports the input shaft 41, and the other bearing 52 is fitted into an inner periphery of the casing 48 so as to rotatably support the input shaft 41. The main bearing 54 is fitted into the inner peripheries of the casing 47 and the first cover 18 which are connected to each other and rotatably supports the casing 48 and the internal gear 44 connected to each other.

Operation Description

If the coil 13 is energized and rotation torque is generated in the rotor 12, the rotor shaft 11 and the input shaft 41 integrated with the rotor 12 rotate about the center axis O1. A motion of the wave generator 41a is transmitted to the external gear 42 according to the rotation of the input shaft 41. A portion of the external gear 42 meshes with the fixed internal gear 45, and thus, the external gear 42 does not rotate following the rotation of the wave generator 41a, and the wave generator 41a relatively rotates inside the external gear 42. In addition, the external gear 42 is restricted along the outer peripheral surface of the wave generator 41a, and thus, is bent and deformed according to the rotation of the wave generator 41a. A period of this deformation is proportional to a rotation period of the wave generator 41a.

If the external gear 42 is deformed by the rotation of the wave generator 41a, a portion (a long shaft portion) of the wave generator 41a having a large diameter moves in a circumferential direction, and thus, a position at which the external gear 42 and the one internal gear 45 mesh with each other is changed in the circumferential direction. The number of teeth of the external gear 42 and the number of teeth of the internal gear 45 are different from each other, and thus, every time the meshing position goes round, the meshing teeth of the external gear 42 and the internal gear 45 are shifted, thereby the external gear 42 rotates. For example, the number of teeth of the internal gear 45 is 102 and the number of teeth of the external gear 42 is 100, a rotational motion of the wave generator 41a is decelerated at a reduction ratio of 100:2 and is transmitted to the external gear 42.

Meanwhile, the external gear 42 similarly meshes with the internal gear 44, and thus, the meshing position between the external gear 42 and the internal gear 44 is changed in the rotation direction by the rotation of the wave generator 41a. The number of teeth of the internal gear 44 and the number of teeth of the external gear 42 are the same as each other, and thus, the external gear 42 and the internal gear 44 are not rotated relatively to each other, and a rotational motion of the external gear 42 is transmitted to the internal gear 44 at a reduction ratio of 1:1. Accordingly, the rotational motion of the wave generator 41a is decelerated and is output to the internal gear 44 and the casing 48 which become an output shaft.

While the power transmission device 1 is driven, the coil 13 is energized. However, the first cover 18 which covers the one end side of the coil end 13a in the axial direction is formed of a resin (non-conductive material), and thus, even when a distance between the first cover 18 and the coil end 13a is short, a portion outside the coil 13 and the device or a portion between the coil 13 and the speed reducer 40 has high insulation properties. In addition, the first cover 18 and the coil 13 are in contact with each other. However, contact surfaces slide against each other, and thus, the first cover 18 and the coil 13 are movable relative to each other. Accordingly, the coil 13 is energized, and thus, even when the coil 13 generates heat and thermally expands, only a very strong distortion force is generated at the contact portion between the first cover 18 and the coil 13, and the durability of the first cover 18 and the stator 15 is hardly affected.

As described above, according to the power transmission device 1 of the present embodiment, the first cover 18 is formed of a resin (non-conductive material), and the first cover 18 is provided close to the coil end 13a to the position at which the creeping distance between the coil end 13a and the first cover 18 is shorter than 6.3 mm. In the related art, the 6.3 mm in the creeping distance is a distance required to sufficiently secure electric insulation from the coil 13, and thus, in the configuration of the related art, the cover is provided to satisfy the distance, and thus, the axial length of the device increases. However, in the present embodiment, according to the above-described configuration, even when the first cover 18 and the coil end 13a are close to each other, it is possible to sufficiently secure the electric insulation from the coil 13, and it is possible to achieve shortening in the axial length and the decrease in the volume of the power transmission device 1.

In addition, according to the power transmission device 1 of the present embodiment, the first cover 18 also serves as the input-side cover of the speed reducer 40, and thus, it is possible to decrease the number of parts and achieve the shortening in the axial length of the entire device including the motor 10 and the speed reducer 40.

In addition, according to the power transmission device 1 of the present embodiment, the first cover 18 is integrated with the internal gear 45 of the speed reducer 40. Accordingly, it is possible to further decrease the number of the parts and to achieve the shortening in the axial length of the entire device.

In addition, according to the power transmission device 1 of the present embodiment, the first cover 18 and the coil end 13a of the stator 15 are in contact with each other. Accordingly, it is possible to assist the fixing of the stator 15, the first cover 18 and the stator 15 are closer to each other, and it is possible to achieve the shortening in the axial length of the entire device.

It should be understood that the invention is not limited to the above-described embodiment, but may be modified into various forms on the basis of the spirit of the invention. Additionally, the modifications are included in the scope of the invention. For example, the above-described embodiment describes the example in which the bending meshing type gear device is used as the speed reducer connected to the motor. However, as the speed reducer of the present invention, various types of speed reducers may be used. In addition, the above-described embodiment describes the example in which the first cover 18 and the coil end 13a of the stator 15 are in contact with each other. However, the first cover 18 and the coil end 13a may be configured not to contact each other. In addition, the above-described embodiment describes the configuration in which the first cover 18 also serves as the input-side cover of the speed reducer 40 and is integrated with the internal gear 45. However, in the present invention, the cover which covers the motor on the speed reducer side in the axial direction may be separately provided from the cover of the speed reducer or may be integrated with the internal gear of the speed reducer. In addition, in the embodiment, the second cover 19 is also formed of a resin. However, the second cover 19 may be formed of a conductive material as long as the shortest creeping distance between the second cover 19 and the coil end 13a is larger than 6.3 mm. In a case where the second cover 19 is formed of the non-conductive material and the shortest creeping distance between the second cover 19 and the coil end 13a is shorter than 6.3 mm, the first cover 18 may be formed of a conductive material and the shortest creeping distance between the first cover 18 and the coil end 13a may be larger than 6.3 mm. In addition, details described in the embodiment can be appropriately changed within a scope which does not depart from the gist of the present invention.

What is claimed is:

1. A power transmission device comprising:
   a motor comprising:
      a stator around which a coil is wound,
      a motor frame which covers the stator, and
      a cover which covers an axial end portion of the motor frame,
   wherein the cover is formed of a non-conductive material, and
   wherein a shortest creeping distance between the cover and a coil end of the coil is 3 mm or less.

2. The power transmission device according to claim 1, further comprising:
   a speed reducer which is connected to the motor,
   wherein the cover serves as an input-side cover which covers an input-side end portion of the speed reducer in an axial direction.

3. The power transmission device according to claim 2, wherein the speed reducer is a bending meshing type gear device, and
   wherein the cover is integrated with a tubular internal gear of the speed reducer.

4. The power transmission device according to claim 1, wherein the cover and the coil end are in contact with each other.

5. The power transmission device according to claim 4, wherein a contact area between the cover and the coil end is 50% or less of a surface area of the coil end.

6. The power transmission device according to claim 5, wherein the contact area between the cover and the coil end is 10% or less of the surface area of the coil end.

7. The power transmission device according to claim 1, wherein the shortest creeping distance between the cover and the coil end is 1 mm or less.

8. The power transmission device according to claim 1, wherein a first cover which covers an axial end portion of the motor frame, a second cover which covers the other axial end portion of the motor frame, and
   a bolt which connects the first cover and the second cover in which the motor frame is interposed between the first cover and the second cover are provided.

9. The power transmission device according to claim 8, wherein the motor frame is formed of a resin, and the first cover and the second cover are formed of a non-conductive material.

10. The power transmission device according to claim 1, wherein the motor includes a rotor in which a permanent magnet is arranged, the cover includes an axial wall portion which covers the motor frame in an axial direction and an inner peripheral wall portion which covers an inner peripheral side of the coil end, and a magnetic sensor for detecting rotation which is disposed in a portion of one end surface of the inner peripheral wall portion and faces the permanent magnet of the rotor is provided.

11. The power transmission device according to claim 1, wherein the motor includes a rotor shaft having a hollow structure, the cover includes an axial wall portion which covers the motor frame in an axial direction and an inner peripheral wall portion which covers an inner peripheral side of the coil end, and a hollow portion of the rotor shaft and a hollow portion of the inner peripheral wall portion communicate with each other.

12. The power transmission device according to claim 1, wherein the cover comprises:

a first cover formed of a non-conductive material, the first cover covering an axial end portion of the motor frame, and a second cover formed of a conductive material, the second cover covering the other axial end portion of the motor frame.

13. The power transmission device according to claim 12, wherein a shortest creeping distance between the first cover and a first coil end of the coil is shorter than 6.3 mm.

14. The power transmission device according to claim 12, wherein a shortest creeping distance between the first cover and a first coil end of the coil is 3 mm or less.

15. The power transmission device according to claim 13, wherein a shortest creeping distance between the second cover and a second coil end of the coil is 6.3 mm or more.

16. The power transmission device according to claim 14, wherein a shortest creeping distance between the second cover and a second coil end of the coil is 6.3 mm or more.

* * * * *